United States Patent [19]

Kerecz

[11] Patent Number: 5,662,796
[45] Date of Patent: Sep. 2, 1997

[54] PORTABLE SWIMMING POOL MAKEUP WATER TREATMENT APPARATUS

[76] Inventor: Robert Charles Jan Kerecz, 2304 SW. 53rd St., Cape Coral, Fla. 33914

[21] Appl. No.: 615,138

[22] Filed: Mar. 25, 1996

[51] Int. Cl.⁶ .............................. E04H 4/16; B01D 27/14
[52] U.S. Cl. .................. 210/169; 210/203; 210/206; 210/242.1; 210/439; 210/460; 239/315; 422/265
[58] Field of Search .................... 210/169, 193, 210/203, 206, 209, 242.1, 416.2, 439, 457, 460; 239/315, 316, 317; 4/508; 422/265, 275, 276

[56] References Cited

U.S. PATENT DOCUMENTS

| | | | |
|---|---|---|---|
| 1,658,830 | 2/1928 | Bingham | 239/316 |
| 1,806,025 | 5/1931 | Seaman | 239/315 |
| 2,985,307 | 5/1961 | Grasmere et al. | 210/169 |
| 3,083,916 | 4/1963 | Neel | 239/315 |
| 4,473,533 | 9/1984 | Davey | 210/169 |
| 4,801,378 | 1/1989 | Desjoyaux et al. | |
| 4,853,131 | 8/1989 | Etani | 210/696 |
| 4,933,080 | 6/1990 | Rundzaitis et al. | 210/420 |
| 5,202,020 | 4/1993 | Desjoyaux et al. | |
| 5,225,074 | 7/1993 | Moini | 210/169 |
| 5,308,482 | 5/1994 | Mead . | |
| 5,367,723 | 11/1994 | Pleva et al. | 4/508 |
| 5,427,748 | 6/1995 | Wiedrich et al. | 210/169 |
| 5,459,886 | 10/1995 | Payne et al. | 4/508 |

Primary Examiner—Neil McCarthy
Assistant Examiner—Theodore M. Green

[57] ABSTRACT

A portable apparatus for the filtration and/or chemical treatment of make-up water for a pool or spa. The apparatus connects to the end of a make-up water fill hose using a non-metallic threaded connector. The apparatus also includes a hollow core for holding pool chemicals or diatomaceous earth, an inner filtration media surrounding the hollow core, and an outer filtration media enclosing the threaded connector, hollow core and inner filtration media. The lower end of the outer filtration media extends past the connection of the hose to the threaded connector to form a skirt, which prevents the connection from contacting the interior of the pool or spa. Additionally, buoyancy is provided such that the apparatus does not contact the bottom of the pool or spa.

1 Claim, 2 Drawing Sheets

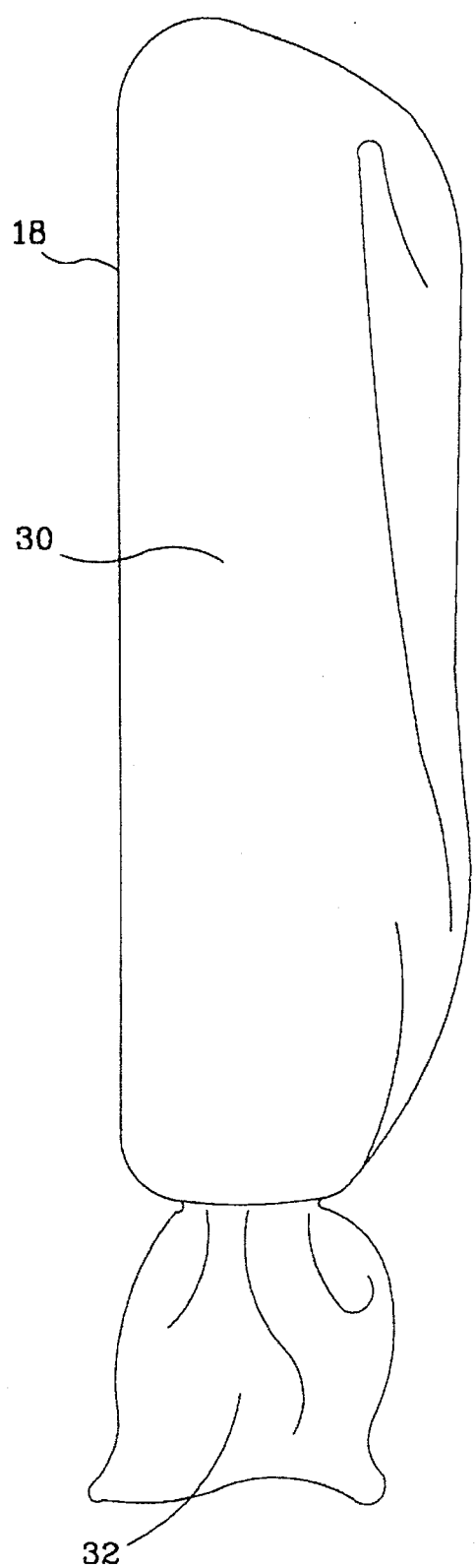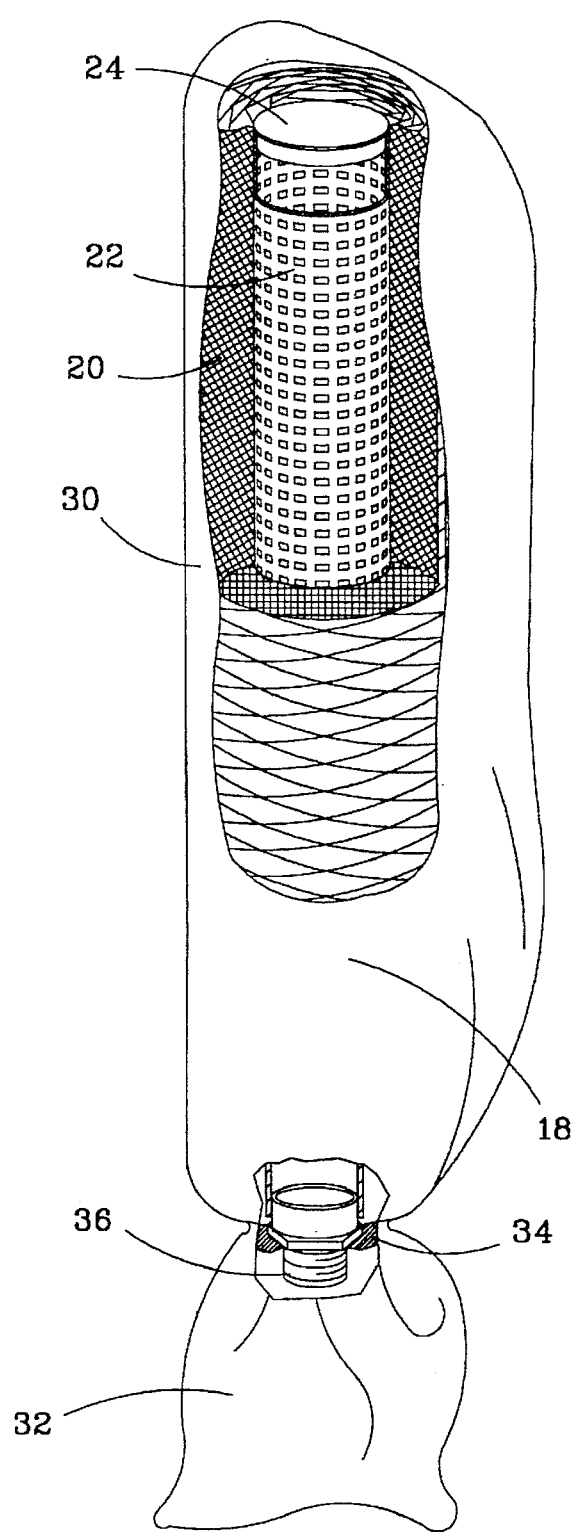

PORTABLE SWIMMING POOL MAKEUP WATER TREATMENT APPARATUS

FIELD OF THE INVENTION

This invention relates to a portable apparatus for the proper filtration or proper filtration and chemical treatment of fill or makeup water for swimming pools and spas.

BACKGROUND OF THE INVENTION

There is a constant demand for the addition of makeup water into a swimming pool or spa. Summertime pool of spa use is usually high and splashout causes large losses of treated, balanced water which then requires the addition of makeup water. Wintertime water losses are also extremely high due to evaporation. Summertime makeup water requires the addition of chemicals because of their loss with the water splashout. Wintertime makeup water does not require the addition of chemicals because the chemicals in the pool were not lost with the evaporating water. Most makeup water is added, unfiltered and untreated, into the pool or spa by dropping a garden hose into the vessel and turning it on. There are no desirable, balanced water sources as is, for introduction as makeup water into a pool or spa. Both city and well water contains some combination of sand, silt, clay, gases, algae, bacteria, viruses, other organics or metals in a ferrous or ferric state. Alone or in combination these contaminants cause stains on pool and spa finishes. These containments also create a demand on the pool or spas free available chlorine residual. As the free available chlorine residual is reduced the pool or spa water becomes prone to algae blooms and bacteria growth. The algae and bacteria growth requires the introduction of large amounts of extra chemicals to kill it, in order to prevent bathers from getting sick and/or infections.

A garden hose lying on the bottom of the pool or spa when filling or adding makeup water will leave either a stain or rough mark on the finish. This is caused by the abrupt change to the waters saturation index against the finish. Pool or spa water must be kept in a state of balance or it becomes either aggressive and eats the finish, or it becomes alkaline and will precipitate calcium or silica out of the water and onto the surface finish. Aggressive makeup water from the hose against the finish either dissolves the finish leaving a small rough crater or dissolves some of the copper out of the hose end which then is quickly deposited as a blue stain onto the finish. Alkaline makeup water from the hose against the finish causes a rough spot in the finish due to either calcium precipitate (which can be removed with muriatic acid), or silica precipitate (which cannot be removed without damaging the finish).

In order to prevent the finish problems that occur due to the garden hose against the bottom, the hose should be held at least twelve inches off of the bottom of the pool or spa and at least twelve inches away from any side.

SUMMARY OF THE INVENTION

This invention relates to a portable apparatus for the proper filtration, or filtration and chemical treatment of, fill or makeup water for swimming pools and spas.

The conventional method of adding water into a swimming pool or spa is to take a garden hose and throw it into the pool or spa, where it sets on the bottom, and turn it on. When the desired water level is reached the hose is turned off and removed from the pool or spa.

This method of adding water causes staining and/or scaling on, and degradation of the surface finish. This method also promotes algae and bacterial growth by lowering free available chlorine residuals in the existing balanced water.

To remove staining and scaling the pool or spa is usually drained and acid washed with muriatic acid. Acid washing always causes degradation of surface finishes and shortens the usable life of the finish. After the acid wash is completed the pool or spa must then be refilled and the water properly balanced.

To remove algae and bacteria, and regain proper free available chlorine residuals, the water must be chemically shocked then rebalanced.

This conventional method of adding fill or makeup water into a pool or spa leaves a lot to be desired. This method causes many added owner or user expenses for water treatment, renovations, and medical treatment for swimmers due to health problems and/or sickness.

The improvement to the process of adding fill or makeup water into a pool or spa is an apparatus that attaches to the end of the fill hose. The apparatus has buoyancy, a non-metallic hose end, a hollow core, depth and absolute filtration, and a skirt at the base.

Because of the buoyancy of the apparatus, the attached hose is kept floating above the surface of the pool or spa. Introducing water at this level allows it to buffer with the balanced water and prevent stains and/or scale and surface degradation of the finish due to dramatic changes in the fill or makeup waters saturation index.

The non-metallic hose end allows for an easy connection to a fill hose and will not cause a stain on the pool or spa finish.

The hollow core allows the user, if required or desired, to add a hose of chemicals into it and treat the feedwater prior to the filtration. This hollow core also allows the user, if required or desired, to add diatomaceous earth into the core which will pass through the inner depth filter media and coat the inside surface of the outer depth filter media resulting in final product water filtration of one micron nominal.

The filtration media consists of the inner depth filter media and the outer absolute filter media. The inner depth filter media is of such pore size that it will allow diatomaceous earth to pass through it yet it traps large quantities of sand, silt, clay, ferric metals, algae and other organics. The outer depth filter media is of such pore size that it traps diatomaceous earth and fine particulate matter, organic and inorganic, not caught by the inner depth filtration media.

The skirted base covers the hose connection, not allowing it to contact the pool or spa finish, preventing a stain on the finish.

This apparatus is not limited to the physical form or size shown in the drawings, variations may be used to treat site specific problems.

List of Drawing Reference Numbers

1. #18 Assembled apparatus side view
2. #20 Inner depth filter media
3. #22 Open center core with holes in its wall
4. #24 Top end plug
5. #26 Inlet fitting with female hose threads
6. #28 Washer
7. #30 Outer absolute filter media
8. #32 Protective skirt
9. #34 Adhesive bonding material 10. #36 Garden hose inlet fitting
11. #38 Inner depth filter
12. #40 Complete inner assembly

BRIEF DESCRIPTION OF THE DRAWINGS

FIG. 1 shows a side view of the preferred embodiment of the invention.

FIG. 3 shows a cross section of the preferred embodiment of the invention.

DETAILED DESCRIPTION OF THE DRAWING

Figure 2:
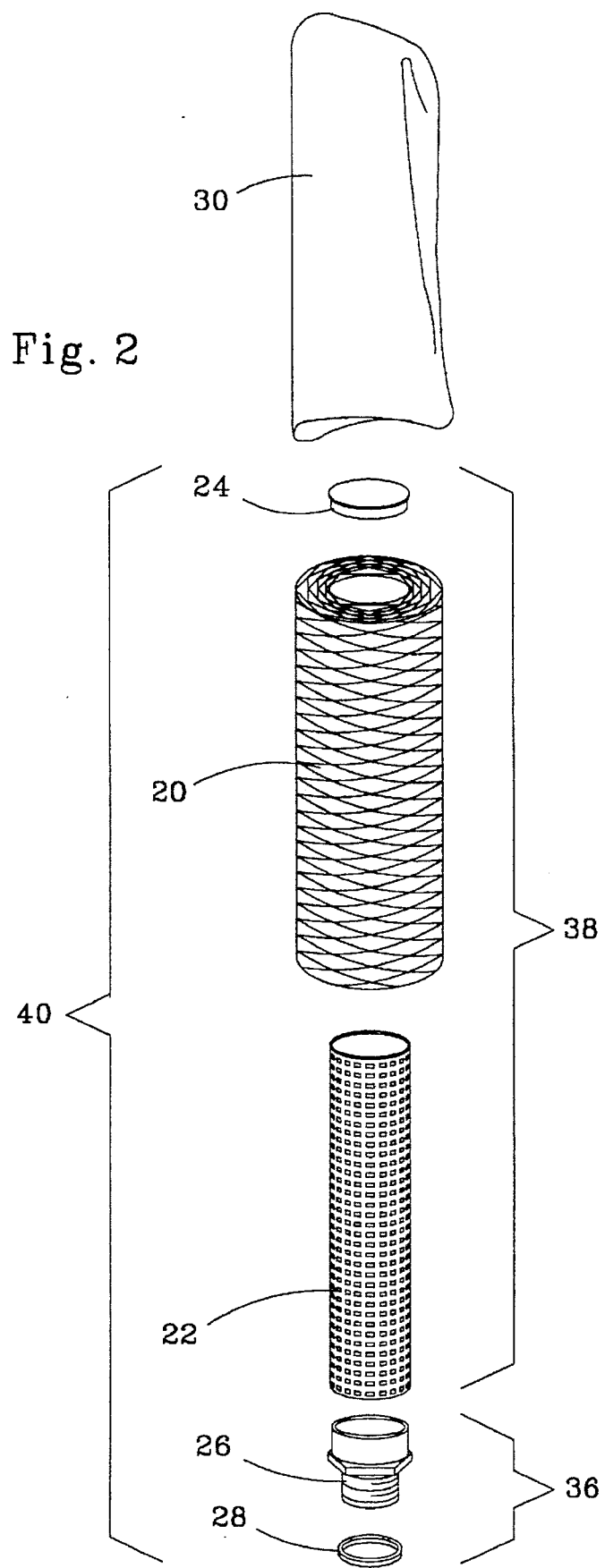
FIG. 2 shows an exploded view of the preferred embodiment of the invention.

Reference is made to the drawings to facilitate an understanding of the invention. The invention comprised of the apparatus is suited for use in the filtration of, or the filtration and chemical treatment of, swimming pool makeup and fill water.

Referring to FIG. 1, shows the shape of #18 assembled apparatus side view with #30 outer absolute filter media and #32 protective skirt which is an extension of #30 outer absolute filter media.

Referring to FIG. 2, the exploded view shows #28 washer that fits into the bottom of #26 inlet fitting with female hose threads and when combined becomes #36 garden hose inlet fitting. #20 inner depth filter media is wound or spun around #22 open center core with holes in its wall and capped at the top with #24 top end plug, when combined become #38 inner depth filter. #36 garden hose inlet fitting and #38 inner depth filter when combined become #40 complete inner assembly. #30 outer absolute filter media is longer than necessary to cover #40 complete inner assembly.

Referring to FIG. 3, the cross section of #18 assembled apparatus side view shows #20 inner depth filter media is wound or spun around #22 open center core with holes in its wall. #22 open center core with holes in its wall is sealed at the top by #24 top end plug and has #36 garden hose inlet fitting inserted into its bottom opening. #30 outer absolute filter media is longer than necessary to cover #40 complete inner assembly and becomes #32 protective skirt from the point where it is sealed by #34 adhesive bonding material to #36 garden hose inlet fitting and #40 complete inner assembly downward and around #36 garden hose inlet fitting.

DETAILED DESCRIPTION OF THE INVENTION

Reference is made to the drawings to facilitate an understanding of the invention. The invention comprised of the apparatus is suited for use in the filtration of, or the filtration and chemical treatment of swimming pool and spa makeup or fill water.

Referring to FIG. 3:

The #20 inner depth filter media, #22 open center core with holes in its wall, and #30 outer absolute filter media are all sealed by #34 adhesive bonding material where they meet at the bottom of both #20 inner depth filter media and #22 open center core with holes in its wall and the side of #26 inlet fitting with female hose threads.

The #30 outer absolute filter media is made longer than necessary to cover the #20 inner depth filter media so a #32 protective skirt is created after and below the #34 adhesive bonding material is applied to the apparatus during manufacture. The #32 protective skirt covers the fill hose end, not allowing it to come in contact with the pool or spa finish, preventing a stain on the finish.

The #26 inlet fitting with female hose threads contains a #28 washer to prevent leakage of unfiltered, or unfiltered and untreated makeup water into the pool or spa.

As the fill or makeup water enters the bottom of the apparatus through #26 inlet fitting with female hose threads it is directed into the #22 open center core with holes in its side. The #22 open center core with holes in its side is sealed at the top with a #24 top end plug forcing the incoming water into and through the #20 inner depth filter media. The #20 inner depth filter media removes large quantities of sand, silt, clay, ferric metals, algae, bacteria and other organics. The #22 open center core may be filled with a variety of treatment chemicals and/or diatomaceous earth powder prior to connecting a hose onto the #26 inlet fitting with female hose threads. User access to the #22 open center core allows the apparatus to be used for different desired or required filtration or filtration and chemical treatment needs.

As the depth filtered or depth filtered and chemically treated water exits the #20 inner depth filter media it contacts the inner surface of #30 outer absolute filter media where the final fine filtration takes place prior to the water entering the pool or spa.

What is claimed is:

1. A portable apparatus for treating make-up water for a swimming pool having an interior surface and water and comprising:

a threaded connector for connecting the apparatus to a make-up water fill hose;

a perforated hollow core in fluid communication with the threaded connector for holding pool chemicals or diatomaceous earth;

an inner filtration media surrounding the hollow core for removing sand, silt, clay, ferric metals, algae and organics from the make-up water;

an outer filtration media having a closed upper end and an open lower end and enclosing the inner filtration media and the threaded connector with the open lower end forming a skirt for preventing the threaded connector from contacting the interior surface of the swimming pool; and buoyancy means for floating the apparatus in the water of the swimming pool.

* * * * *